US008555249B2

(12) United States Patent
Demant et al.

(10) Patent No.: US 8,555,249 B2
(45) Date of Patent: Oct. 8, 2013

(54) LIFECYCLE STABLE USER INTERFACE ADAPTATIONS

(75) Inventors: Hilmar Demant, Karlsdorf (DE); Sebastian Droll, Heidelberg (DE); Joachim Fitzer, Schriesheim (DE); Ioannis Grammatikakis, Maxdorf (DE); Jan Heiler, Walldorf (DE); Juergen Sattler, Wiesloch (DE); Frank Schertel, Mannheim (DE); Juergen Specht, Benningen (DE); Markus Viol, Walldorf (DE); Thorsten Weber, Mannheim (DE)

(73) Assignee: SAP AG, Walldorf (DE)

( * ) Notice: Subject to any disclaimer, the term of this patent is extended or adjusted under 35 U.S.C. 154(b) by 368 days.

(21) Appl. No.: 12/965,940

(22) Filed: Dec. 13, 2010

(65) Prior Publication Data
US 2012/0151439 A1     Jun. 14, 2012

(51) Int. Cl.
*G06F 9/44*   (2006.01)

(52) U.S. Cl.
USPC .......................... 717/120; 717/104; 717/108

(58) Field of Classification Search
None
See application file for complete search history.

(56) References Cited

U.S. PATENT DOCUMENTS

| | | | | |
|---|---|---|---|---|
| 7,340,714 B2* | 3/2008 | Upton | | 717/120 |
| 7,831,637 B2* | 11/2010 | Sattler et al. | | 707/805 |
| 8,015,545 B2* | 9/2011 | Seto et al. | | 717/108 |
| 8,069,437 B2* | 11/2011 | Aigner et al. | | 717/120 |
| 8,126,984 B2* | 2/2012 | Vogler et al. | | 709/217 |
| 8,381,180 B2* | 2/2013 | Rostoker | | 717/120 |
| 2003/0090514 A1* | 5/2003 | Cole et al. | | 345/744 |
| 2004/0015858 A1* | 1/2004 | Seto et al. | | 717/104 |
| 2004/0148586 A1* | 7/2004 | Gilboa | | 717/108 |
| 2005/0097516 A1* | 5/2005 | Donnelly et al. | | 717/120 |
| 2005/0235223 A1* | 10/2005 | Arend et al. | | 717/120 |
| 2005/0278653 A1* | 12/2005 | Scholz | | 715/780 |
| 2006/0080082 A1* | 4/2006 | Ravindra et al. | | 704/8 |
| 2007/0074161 A1* | 3/2007 | Dorn et al. | | 717/108 |
| 2007/0261025 A1* | 11/2007 | Seto et al. | | 717/108 |
| 2008/0127052 A1* | 5/2008 | Rostoker | | 717/104 |
| 2008/0162095 A1* | 7/2008 | Brunswig et al. | | 703/6 |
| 2008/0306753 A1* | 12/2008 | Brunswig et al. | | 705/1 |
| 2009/0158134 A1* | 6/2009 | Wang et al. | | 715/222 |
| 2010/0057776 A1* | 3/2010 | Baeuerle et al. | | 707/104.1 |
| 2011/0161940 A1* | 6/2011 | Brunswig et al. | | 717/139 |
| 2011/0161942 A1* | 6/2011 | Brunswig et al. | | 717/143 |
| 2011/0208788 A1* | 8/2011 | Heller et al. | | 707/810 |
| 2011/0239141 A1* | 9/2011 | Wang et al. | | 715/763 |
| 2012/0030580 A1* | 2/2012 | Schlarb et al. | | 715/741 |
| 2012/0096072 A1* | 4/2012 | So et al. | | 709/203 |
| 2012/0166976 A1* | 6/2012 | Rauh et al. | | 715/762 |

(Continued)

OTHER PUBLICATIONS

Vivian Genaro Motti, "A Computational Framework for Multi-Dimensional Context-aware Adaptation", 2011 ACM, EICS'11, Jun. 13-16, 2011, Pisa, Italy, pp. 315-318; <http://dl.acm.org/citation.cfm?id=1996545>.*

(Continued)

*Primary Examiner* — Thuy Dao
*Assistant Examiner* — Ben C Wang (57) ABSTRACT

Various embodiments of systems and methods for lifecycle stable user interface adaptations are described herein. All adaptations done by partners/key users/end users to a user interface of a computer software application are preserved during the lifecycle of the application. In one aspect, the adaptations are persisted as additional metadata used for the generation of the user interface. In another aspect, the lifecycle stability is achieved by attaching the adaptations to semantically coherent set of fields placed in the UI that reappear in future releases of the computer software application.

16 Claims, 4 Drawing Sheets

(56) References Cited

U.S. PATENT DOCUMENTS

| | | | |
|---|---|---|---|
| 2012/0166977 A1* | 6/2012 | Demant et al. | 715/762 |
| 2012/0166985 A1* | 6/2012 | Friend et al. | 715/765 |
| 2012/0170727 A1* | 7/2012 | Karnalkar et al. | 379/93.09 |

OTHER PUBLICATIONS

SAP AG, "SAP Business by Design UI Style Guide", Jan. 2012 SAP AG, pp. 1-275; <http://www.sapdesignguild.org/resources/ByD_UI_Styleguide_2012_FP35.pdf>.*

Hirschfeld et al., "Dynamic Service Adaptation for Runtime System Extensions", IFIP International Federation of Information Processing 2004, WONS 2004, LNCS 2928, pp. 227-240; <http://www.hpi.uni-potsdam.de/hirschfeld/publications>.*

Obeidat et al., "Integrating User Interface Design Guidelines with Adaptation Techniques to Solve Usability Problems", 2010 IEEE, pp. VI-280-VI-284; <http://ieeexplore.ieee.org/stamp/stamp.jsp?tp=& arnumber=5579015>.*

* cited by examiner

PURCHASE ORDER OVERVIEW: 4017 ~110

STATUS NOT CONFIRMED   SUPPLIER MC2000 AMS   NET VALUE 10,000USD   ORDERED ON 29.07.2009
CREATED ON 29.07.2009                                      CREATED BY PETER GREENE

[EDIT] [CLOSE] [PRINT] [NEW]                                                        [VIEW ALL]

GENERAL INFORMATION ~120
STATUS: NOT CONFIRMED
ORDER NUMBER: 4017
PURCHASING UNIT: MC22000 PROCUREMENT ~180
BUYER RESPONSIBLE: MC0678 PETER GREENE ~190

INCOTERMS: EXW – AB FACTORY
INCOTERMS-PLACE: AMS, AKRON
PAYMENT CONDITIONS: 14 DAYS 3%, 30 DAYS 2%,
~140                  60 DAYS NO DEDUCTION

SUPPLIER ~130
AMS
166 SOUTH HIGH STREET ~160
AKRON OH 44308
UNITED STATES
MAIN CONTACT: MICHAEL DONOHAN

BILL-TO PARTY
AKRON HEATING TECHNOLOGIES INC. ~170
1128 NORTH STREET
AKRON OH 44308
UNITED STATES

PURCHASE ORDER ITEMS ~150

| NUM | PRODUCT NUMBER | PRODUCT DESCRIPTION | PRODUCT CATALOG | DELIVERY DATE | NUMBER OF DELIVERIES / LOCATIONS | QUANTITY | NET VALUE | PRICE PER UNIT | NET VALUE/ LIMIT |
|---|---|---|---|---|---|---|---|---|---|
| 1 | | ASDFASDFASD | 10-20 | 05.08.2009 | | 1EA | 10,000 USD | 1EA  10,000 USD | |

LIFECYCLE STABLE USER INTERFACE ADAPTATIONS

FIELD

The field relates to user interfaces (UIs). More precisely, the field relates to preserving user adaptations over a base UI model during its lifecycle.

BACKGROUND

There are many business oriented computer applications providing the user with the ability to modify parts of the UI of the application for better visibility and/or functionality. The user is given the option to show and hide elements, change the location of UI elements on the screen, rename some text elements, add custom fields, etc. When the computer application is updated due to an upgrade, the user adaptations to the old version are lost and the user/partner is forced to apply his customizations again with every release of the computer application.

There is a need for improved methods and systems that allow lifecycle stable UI adaptations. Thus the user is not forced to react on updates of the computer application and is able to utilize the computer application undisturbed from any new releases. The only acceptable change from the user's point of view is minor repositioning of the change, as long as it preserves the semantics derived from the surrounding context. For example, in a business environment, if a user adds a custom field "distance" in the screen area "supplier", after an upgrade the field "distance" must again be placed in the section "supplier" and not in an area "bill-to-party" or a generic area "lost-and-found", where the semantics of the field cannot be preserved. The semantic should be preserved, even if the section is moved to a new UI screen.

SUMMARY

Various embodiments of systems and methods for lifecycle stable UI adaptations are described herein. In one embodiment, the method includes receiving one or more user interface (UI) adaptations to a default UI and saving the one or more UI adaptations in a metadata file maintained for storing the one or more UI adaptations. The method also includes reconstructing the one or more UI adaptations by combining the metadata file together with a data file used for generation of the default UI.

In other embodiments, the system includes at least one processor for executing program code and memory, a display to visualize a UI, an input device to receive user's UI adaptations, and a file system repository to persist information for the generation of the UI. The system also includes an extractor module within the memory to store the user's UI adaptations to the file system repository as a secondary source of information for UI generation and a UI generator module within the memory to generate the UI by combining a default source of information for UI generation and the secondary source of information for UI generation.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for lifecycle stable UI adaptations are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
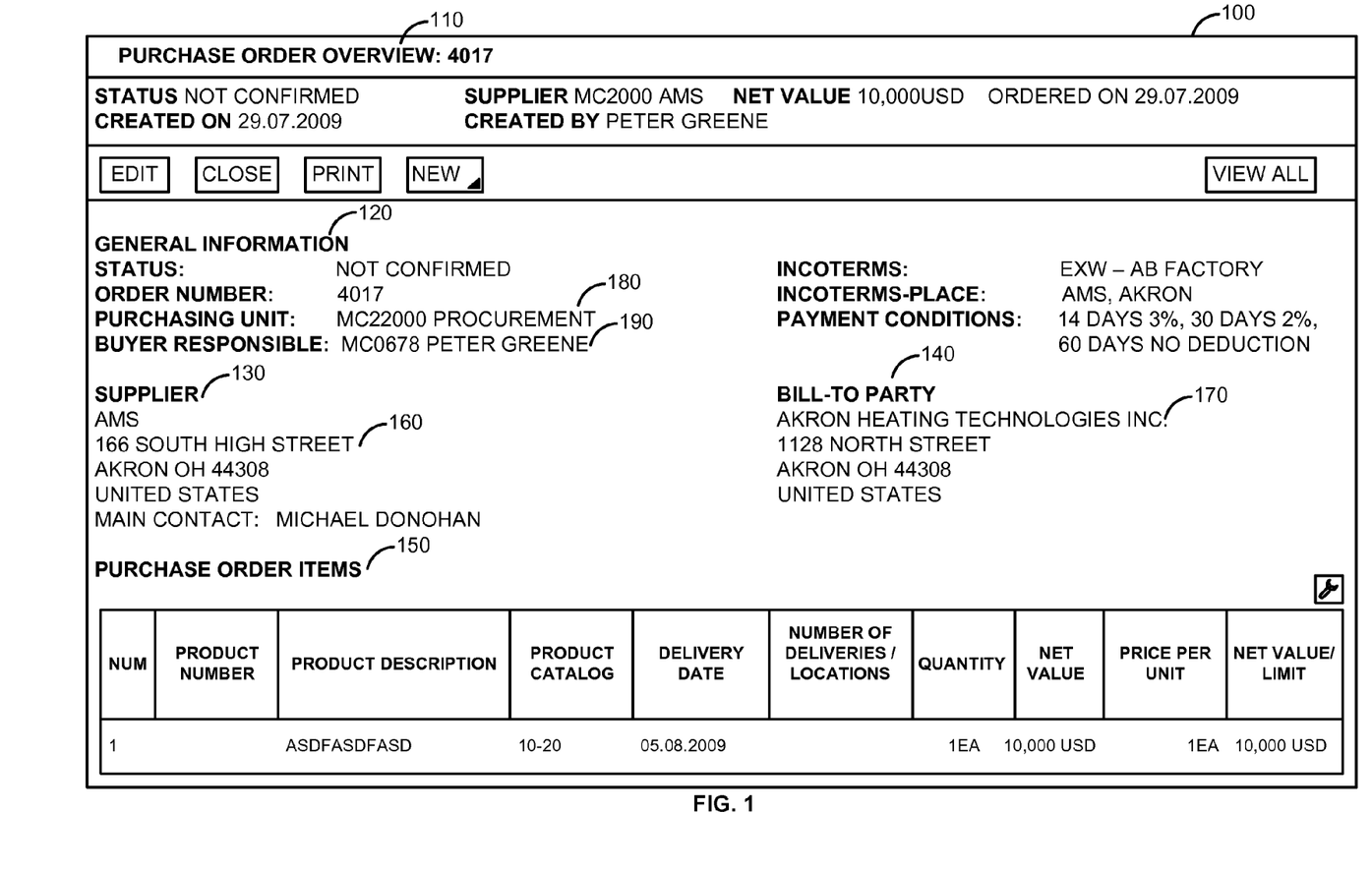
FIG. 1 is an exemplary screenshot of a UI that allows stable UI adaptations.

FIG. 1 represents an exemplary screenshot of a UI 100 that allows stable UI adaptations. The UI 100 is enriched during development with additional metadata that stores the adaptations and helps in case of an upgrade to reconstruct the adaptations done by users. For every change during the development of UI 100, this metadata has to be maintained consistently. Good tool integration is necessary to maintain this metadata along the normal UI development process.

Attaching extensions to UI entities and avoiding lifecycle issues during updates/upgrades is achieved by attaching the extensions to strictly defined extension points that are called stable anchors. These stable anchors define a contract for the extension. The provider guarantees that all stable anchors released to users will exist in follow-up releases. A stable anchor is defined by a system-wide unique identification (ID) and a referenced entity. The stable anchors are semantically coherent set of fields placed in the UI. This set may either be a section group, list, query, defaultSet, floorplan, in- or out-port, pane container, button group, workcenter view, work center, assigned objects, global settings, quick link, overview page or Really Simple Syndication (RSS) usage. Even when parts of the UI are rearranged in future releases of the UI, these parts reappear in new revised versions of the UI as no functionalities are removed. Thus, all UI parts for which there is additional metadata indicating what changes have been performed on the UI along the UI development process, with the purpose of reconstructing any user adaptation, are referred to as stable UI anchors. UI developers may delete stable anchors created during the current UI development until the UI is shipped to the user system. Then the stable anchors remain stable as their deletion is not allowed any more, only movements of the stable anchors are allowed.

In FIG. 1, the purchase order factsheet 100 has the following screen areas that may be treated as stable anchors: "Purchase Order Overview" 110, "General Information" 120, "Supplier" 130, "Bill-to-party" 140, "Purchase Order Items" 150. Button groups and outports are also considered as good candidates for stable anchors. Outports are output ports used for performing data binding between UI components. Thus changes to data displayed in one UI component affect data in another component. For example, a list of employee names in a table view is displayed that lists all the employees in a company. This view can be connected to an output form that enables the user to select certain employees from the list and display them with all of their details. The information between the two forms is therefore "bound together."

The reference field is for ensuring that the field is added at the proper place of the repository behind the user interface. For example, the field is added on the correct node of a business object (BO). However, the reference field has no information about how this field translates in a position in the UI and survives upgrades of the UI. For the position is used a stable anchor in the UI. For the use case of "adding extension fields" the best suited anchor is a group of fields in the UI. This group of fields can be a "section group" or a "list". An extension field then has a reference to a reference field and to a stable anchor in the UI. The reference field takes care to recreate the field in the proper place in the BO for instance, and the stable UI anchor takes care that the field will be again positioned into the right section group or list in the UI. The placement in the UI always happens relative to a stable anchor. Even if the exact placement of this field inside the correct section group cannot be guaranteed it is sufficient to have the field in the "correct" section group.

Every stable UI anchor has a unique name and a reference to a reference field. One single section group in the UI may be host for multiple anchors with different reference fields. This is the case when the UI developer has decided to put fields from different "business contexts" into one section group. In that case the key user or partner has to select the "business context" when trying to add an extension field to a section group. After the key user/partner selects the "business context" for adding an extension field this field is created with a reference to the anchor selected. This mechanism ensures that even in future releases if the developer decides to split the fields from different "business contexts" into separate section groups or even UIs, the extension fields follow the anchor that was selected during creation. This mechanism allows to re-apply the addition of an extension field in the following cases: moving a section group to another position of the same UI; displaying data in a list instead of a form or in a form instead of a list; merging to sections; moving a section group to another UI; splitting a section group into two section groups; splitting a UI into two specialized UIs and distributing the section groups between the two UIs; and creating a follow up UI that replaces two UIs.

In one embodiment, for adding a mashup component in a floorplan, an outport has to be available in the floorplan that exports the attributes needed for the mashup component. A mashup is a web page or application that uses and combines data, presentation or functionality from two or more sources to create new services. For already known use cases (address, maps, etc.) these ports are defined, and an adoption task is created to enable all floorplans with the already known outports. A mashup can connect to these outports and consume the attributes that are exported in the outports. A mashup has no way to access any data from a UI component if the data are not exposed via an outport. All outports which are supposed to be used by partners/key users/end users to enable mashups must be treated as stable UI anchors. For the ports, the same applies as for the stable UI anchors described for extension fields. As soon as a stable anchor is released for the customers, this anchor cannot be deleted from the UI; instead, identification is needed for where this outport has been moved, to ensure that all configured mashups are also moved along the anchor to the new position. Together with the outports the port types used by these outports have also to be treated as stable UI anchors. In the above example of FIG. 1 two outports qualify for stable anchors for mashup. The first is the outport "Supplier Address" 160 and the other is the outport "Bill-to-Address" 170. Both outports adhere to the same port type (Address) and can be used, for example, to display map information for the addresses. The purchase order factsheet 100 as any other floorplan exposes many more outports (e.g., supplier 130, Purchasing unit 180, Buyer responsible 190) but these outports may not be treated as stable UI anchors. Only for the ports that are defined as stable UI anchors, the developer has to make sure that they will be available in all follow-up releases. The outports may move to a completely new floorplan but they must be available in a followup release.

For the positioning of the mashup component on the UI some additional precaution is needed. For the example in FIG. 1, the positioning of the mashup may add to the semantics of the displayed component. For example, even a component is added for address on the floorplan, it may be important to display the map for supplier under the supplier data and the map for Bill-To-data under the section of the Bill-To-data. In normal case the partner or key user positions the component in a meaningful way, but in case the UI is changed in a follow-up release (for example the Supplier and Bill-To-data are displayed in two separate tabs instead of two separate sections), then a fallback has to be defined that ensures that the business semantic remains intact. In one embodiment, additional elements may be defined to exist on the UI screen for the business semantic to remain intact. In one embodiment, the additional elements are selected from a contract section to the stable anchor by checking desired elements.

In one embodiment, additional "read only" information in a floorplan is added. This use case is handled in a similar way as the before mentioned mashup use case. This means the user has to provide a UI component, which can be embedded in an existing UI component (e.g. factsheet) as a loosely coupled component that gets the information via an outport of the embedding component. As discussed in the mashup use case, a corresponding outport (marked as stable anchor) is needed in the floorplan. The loosely coupled component can then by itself retrieve any data needed from the backend. To enable this use case it makes sense to expose an outport in every floorplan that exports the key of the main BO of the floorplan in an outport that is marked as stable anchor.

In one embodiment, navigation to an own UI component in a floorplan is added. This is launching a Customer UI component out of a standard floorplan. Here the same mechanism and stable anchors can be used. This outport can then be used to trigger navigation to a UI component. The easiest way is to place a button in the button group of the Contextual navigation Region (top most button group) of the UI. Another possibility is to introduce stable anchors that can be placed inside specific button groups and can be handled as all other stable UI anchors described before. In any follow-up release it must be ensured that the stable UI anchors for buttons are again positioned in a button group. From "Identity & Access" management viewpoint, the additional UI component must be assigned to a "Workcenter View" that is assigned to a user to enable the navigation at runtime. There are two possible ways to achieve this: either the user adds his UI component as assigned object to an already existing Workcenter View or the user creates an own Workcenter View which has to be assigned to the user separately. For both ways there are valid use cases. To support the first use case it is needed to treat all released workcenter views as stable anchors, which means if a workcenter view is ever deleted, a follow up workcenter view has to be maintained, where the user extension will be taken over.

In one embodiment, to achieve stability during upgrade for partner/key user/end user extensions according the described use cases, it is essential to change the way the repository behind the UI handles extensions. This may be achieved by replacing a generic (XML based) diff/merge mechanism by a mechanism of modeled "change records" that are applied to a UI component by a plug-in that deals with this kind of change. Furthermore a tool that creates these changes (either UI runtime authoring or UI designer) is able to store and access these changes explicitly in the repository. In one embodiment, a dispatcher module determines which changes have to be applied to the Base XML in which order and call the right plug-in to apply the changes after an upgrade/change in a system. Furthermore, the repository has to provide a mechanism to handle stable anchors and use these anchors as a reference for change records to make sure that it collects all the change records that have to be applied to a UI component even if stable anchors have moved to a new UI component. These mechanisms cannot always run at runtime, therefore a load for a UI component is to be created with all changes applied. It is important to separate the end user personalization aspect completely. The key user adaptations are applied in the backend once a change is applied. The result is stored separately and is used if the client requests the UI at runtime. The end user personalization change records must also be handled by the repository but when the UI runtime requests a UI component it needs to retrieve the company wide load of the UI component plus the list of change records that have to be applied for end user personalization. For the company wide load in the repository, the key-user personalization and the dynamic adaptation of UI files do not overlap. The end user dynamic adaptation overrides any key-user personalization if the changes are applied to the same entity in the same way. For example, if the key user defines an entity of the UI to be hidden, while the end user defines the same as visible, the entity will be present at end user runtime.

Figure 2:
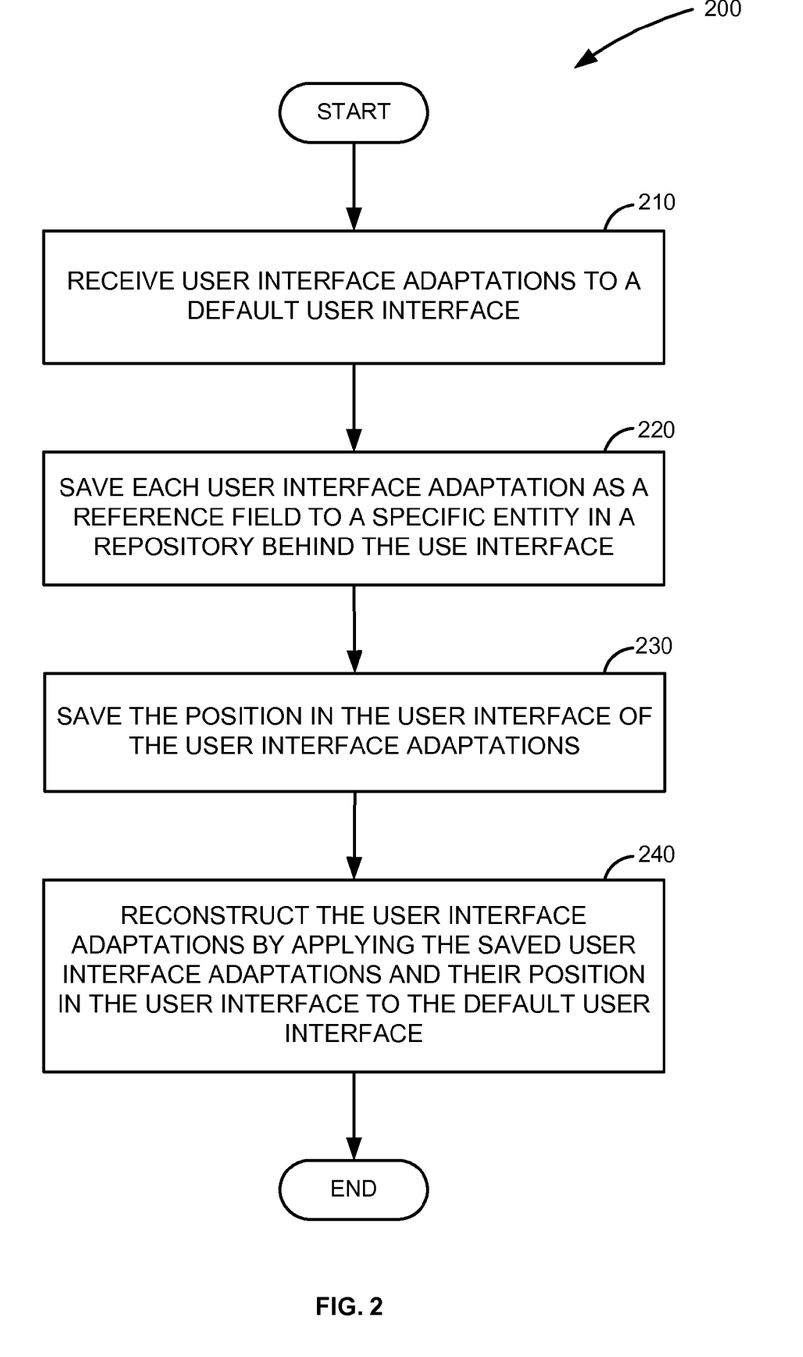
FIG. 2 is a flow diagram of an embodiment of a method for lifecycle stable UI adaptations.

FIG. 2 is a flow diagram of an embodiment of a method 200 for lifecycle stable UI adaptations. The method begins at block 210 with receiving user interface (UI) adaptations to a default UI. In one embodiment, a UI adaptation is selected at runtime from a UI panel comprising a selection list with screen areas on which the adaptations are performed on and a list with a set of changes applicable for each of the screen areas. The set of changes are semantically coherent to the corresponding screen area.

At decision block 220, each UI adaptation is saved as a reference field to a specific entity in a repository behind the UI. In one embodiment, an extensible markup language (XML) file is used for saving the UI adaptation.

At decision block 230, the position in the UI of the UI adaptations is saved. In one embodiment, the position is saved in an XML file.

Finally at block 240, the UI adaptations are reconstructed by combining the saved UI adaptations and their position in the UI to the default UI. In one embodiment, the UI adaptations are reconstructed by merging XML files used for saving the UI adaptations and their position in the UI with an XML file used for generation of the default UI.

In one embodiment, the UI adaptations are reconstructed over future releases of the default UI.

Figure 3:
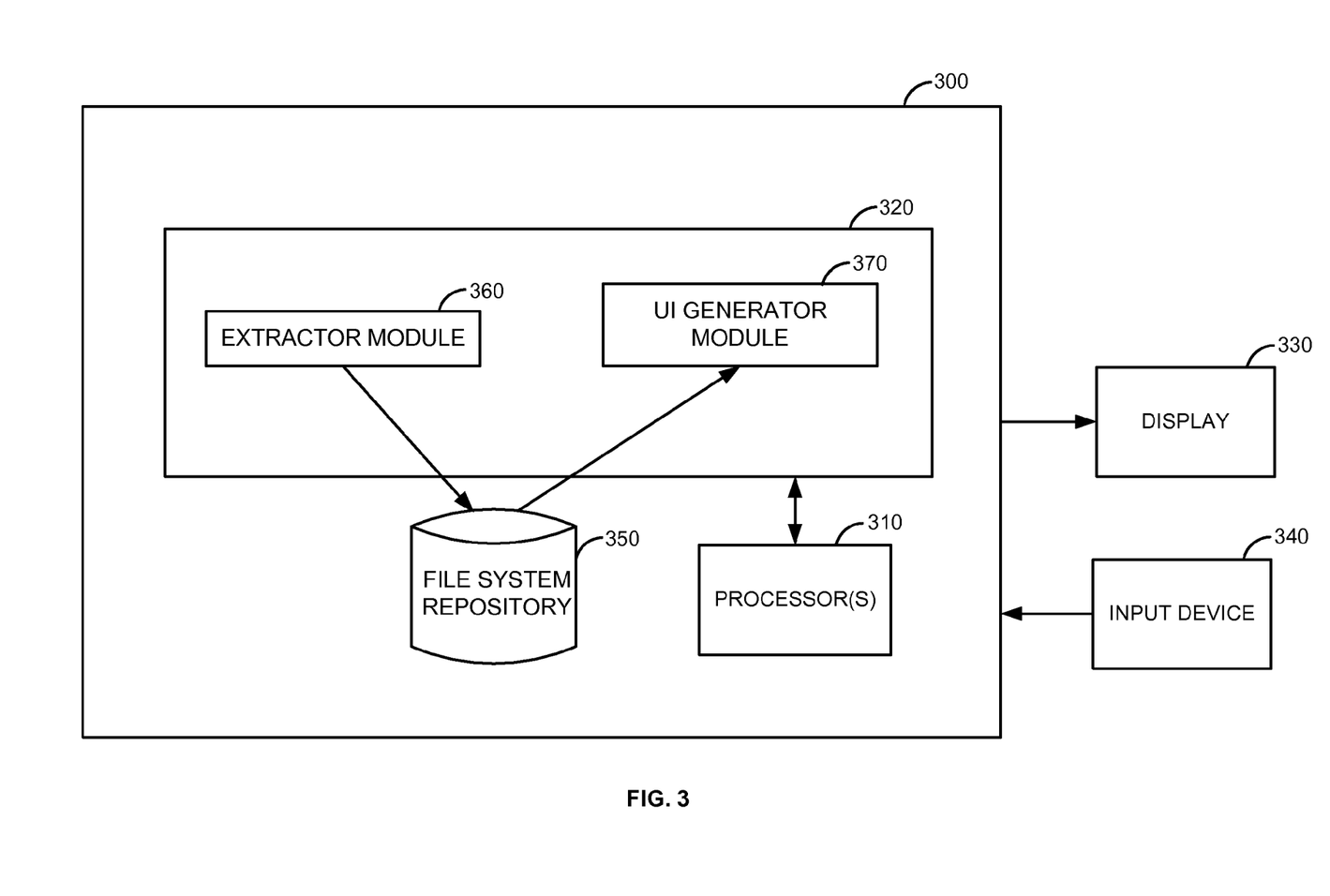
FIG. 3 is a block diagram of an embodiment of a system for lifecycle stable UI adaptations.

FIG. 3 is a block diagram of an embodiment of a system 300 for lifecycle stable UI adaptations. The system includes one or more processors 310 for executing program code. Computer memory 320 is in connection to the one or more processors 310. The system 300 is connected to a display 330 for visualization of UIs and to an input device 340 to receive user's UI adaptations. In one embodiment, the user's UI adaptations are selected from a set of allowed changes to the UI.

The system 300 further includes a file system repository 350 to persist information for UI generation. The memory 320 also includes an extractor module 360, and a UI generator module 370. The extractor module 360 is intended to store the user's UI adaptations to the file system repository 350 as a secondary source of information for UI generation. In one embodiment, the secondary source of information for UI generation is an XML file comprising the user's UI adaptations.

The generator module 370 is in communication with the repository 350 and is intended to generate UIs by combining a default source of information for UI generation and the secondary source of information for UI generation. In one embodiment, the default source of information comprises default elements and organization of the UI before the user's UI adaptations. In one embodiment, the default source of information for UI generation is an XML file. In yet another embodiment, the default source of information is updated periodically by a UI provider.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 4:
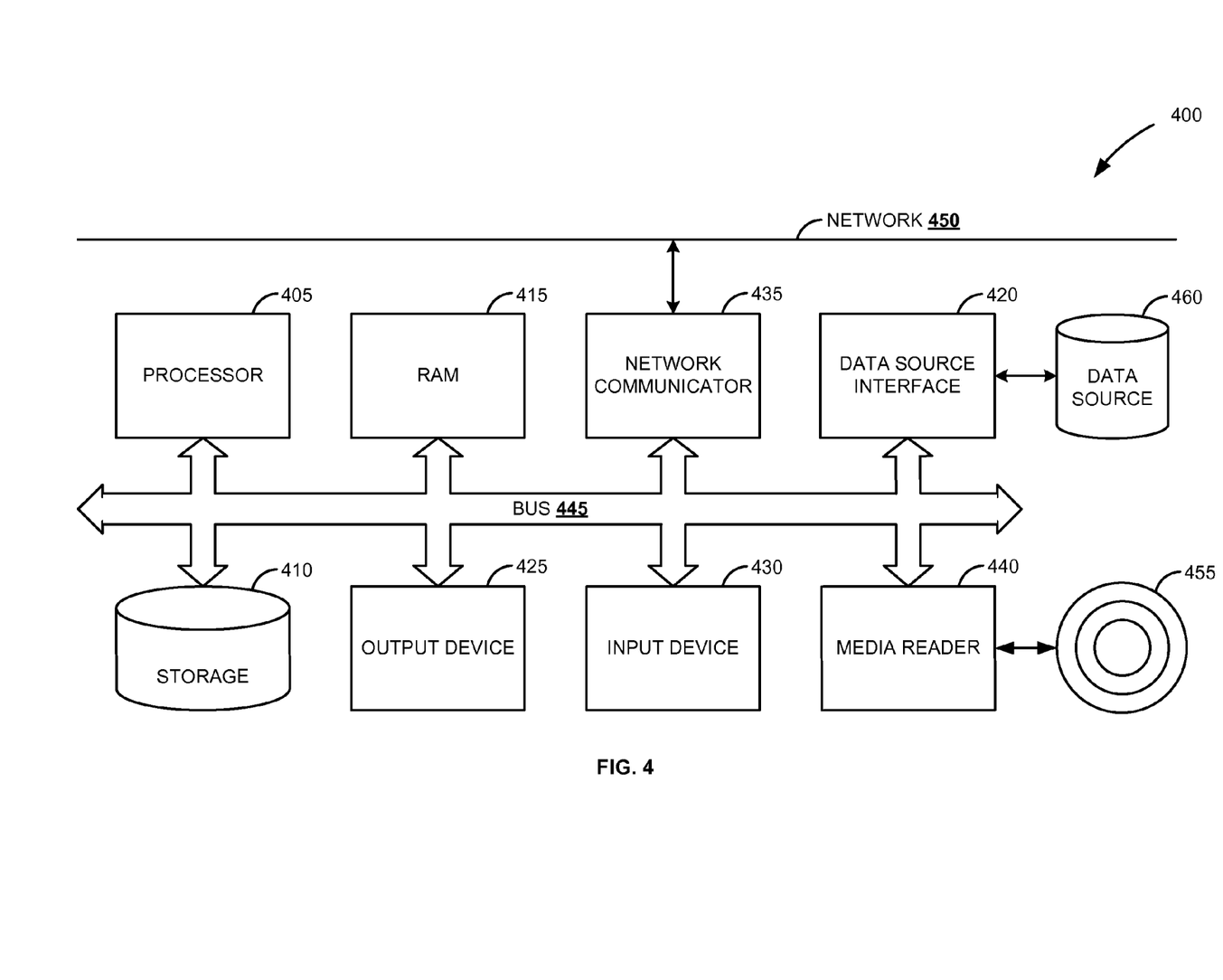
FIG. 4 is a block diagram illustrating a computing environment in which the techniques described for lifecycle stable UI adaptations can be implemented, according to an embodiment of the invention.

FIG. 4 is a block diagram of an exemplary computer system 400. The computer system 400 includes a processor 405 that executes software instructions or code stored on a computer readable storage medium 455 to perform the above-illustrated methods of the invention. The computer system 400 includes a media reader 440 to read the instructions from the computer readable storage medium 455 and store the instructions in storage 410 or in random access memory (RAM) 415. The storage 410 provides a large space for keeping static data where at least some instructions could be stored for later execution. The stored instructions may be further compiled to generate other representations of the instructions and dynamically stored in the RAM 415. The processor 405 reads instructions from the RAM 415 and performs actions as instructed. According to one embodiment of the invention, the computer system 400 further includes an output device 425 (e.g., a display) to provide at least some of the results of the execution as output including, but not limited to, visual information to users and an input device 430 to provide a user or another device with means for entering data and/or otherwise interact with the computer system 400. Each of these output devices 425 and input devices 430 could be joined by one or more additional peripherals to further expand the capabilities of the computer system 400. A network communicator 435 may be provided to connect the computer system 400 to a network 450 and in turn to other devices connected to the network 450 including other clients, servers, data stores, and interfaces, for instance. The modules of the computer system 400 are interconnected via a bus 445. Computer system 400 includes a data source interface 420 to access data source 460. The data source 460 can be accessed via one or more abstraction layers implemented in hardware or software. For example, the data source 460 may be accessed by network 450. In some embodiments the data source 460 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A computerized method for lifecycle stable user interface (UI) adaptations, a computer including at least one processor for executing program code and memory, the method comprising:
    receiving at least one user interface (UI) adaptation to a default UI;
    saving the at least one UI adaptation as a reference field to a specific entity in a repository behind the UI;
    saving the position in the UI of the at least one UI adaptation;
    reconstructing the at least one UI adaptation by combining the saved at least one UI adaptation and the position in the UI of the at least one UI adaptation to the default UI; and
    reconstructing the at least one UI adaptation to a following release of the default UI by using one or more stable anchors as extension points to attach the at least one UI adaptation, wherein the at least one UI adaptation is selected at runtime from a UI panel comprising a first selection list with one or more screen areas on which the at least one UI adaptation is performed, and a second selection list with a set of changes applicable for the one or more screen areas, and wherein the one or more stable anchors are semantically coherent set of fields in the default UI remaining in the following release of the default UI.

2. The method of claim 1, wherein the set of changes is semantically coherent to the one or more screen areas on which the at least one UI adaptation is performed.

3. The method of claim 1, wherein a first extensible markup language (XML) file is used for saving the at least one UI adaptation and its position in the UI.

4. The method of claim 3, wherein a second XML file is used for generation of the default UI.

5. The method of claim 4, wherein reconstructing the at least one UI adaptation further comprises merging the first XML file used for saving the at least one UI adaptation together with the second XML file used for generation of the default UI.

6. An article of manufacture including a non-transitory computer readable storage medium to tangibly store instructions, which when executed by a computer, cause the computer to:
   receive one or more user interface (UI) adaptations to a default UI;
   save the one or more UI adaptations in a metadata file maintained for storing the one or more UI adaptations;
   reconstruct the one or more UI adaptations by combining the metadata file together with a data file used for generation of the default UI; and
   reconstruct the one or more UI adaptations to a following release of the default UI by using one or more stable anchors as extension points to attach the one or more UI adaptations, wherein the one or more UI adaptations are selected at runtime from a UI panel comprising a first selection list with one or more screen areas on which the one or more UI adaptations are performed, and a second selection list with a set of changes applicable for the one or more screen areas, and wherein the one or more stable anchors are semantically coherent set of fields in the default UI remaining in the following release of the default UI.

7. The article of manufacture of claim 6, wherein the set of changes is semantically coherent to the one or more screen areas, on which the one or more UI adaptations are performed.

8. The article of manufacture of claim 6, wherein the metadata file is an extensible markup language (XML) file.

9. The article of manufacture of claim 6, wherein the data file used for generation of the default UI is an XML file.

10. The article of manufacture of claim 6, wherein the instructions to reconstruct the one or more UI adaptations by combining the metadata file together with a data file used for generation of the default UI further cause the computer to merge the metadata file with the data file used for generation of the default UI.

11. A computer system for lifecycle stable user interface (UI) adaptations including at least one processor for executing program code and memory, the system comprising:
   a display to visualize a UI;
   an input device to receive user's UI adaptations;
   a file system repository to persist information for the generation of the UI;
   an extractor module within the memory to store the user's UI adaptations to the file system repository as a secondary source of information for UI generation, wherein the user's UI adaptations are attached to one or more stable anchors as extension points, and wherein the user's UI adaptations are selected at runtime from a UI panel comprising a first selection list with one or more screen areas on which the user's UI adaptations are performed, and a second selection list with a set of changes applicable for the one or more screen areas, and wherein the one or more stable anchors are semantically coherent set of fields in a default version of the UI remaining in a following release of the UI; and
   a UI generator module within the memory to generate the UI by combining a default source of information for UI generation and the secondary source of information for UI generation.

12. The system of claim 11, wherein the user's UI adaptations are selected from a set of allowed changes to the UI.

13. The system of claim 11, wherein the secondary source of information for UI generation is an XML file comprising the user's UI adaptations.

14. The system of claim 11, wherein the default source of information comprises default elements and organization of the UI before the user's UI adaptations.

15. The system of claim 11, wherein the default source of information for UI generation is an XML file.

16. The system of claim 11, wherein the default source of information is updated periodically by a UI provider.

* * * * *